(12) United States Patent
Sutton

(10) Patent No.: US 6,231,062 B1
(45) Date of Patent: May 15, 2001

(54) SUSPENSION ARRANGEMENT FOR A MOTOR VEHICLE

(75) Inventor: Guy Royston Tyrrell Sutton, Solihull (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/489,794

(22) Filed: Jan. 24, 2000

(30) Foreign Application Priority Data

Feb. 6, 1999 (GB) .................................................. 9902598

(51) Int. Cl.⁷ .................................................. B60G 15/00
(52) U.S. Cl. .............................. 280/124.146; 280/124.134; 280/124.145
(58) Field of Search .......................... 280/93.512, 93.51, 280/93.511, 124.1, 124.125, 124.134, 124.145, 124.146, FOR 110, FOR 111, FOR 124, FOR 125, FOR 126

(56) References Cited

U.S. PATENT DOCUMENTS 4,715,615   12/1987   Kijima et al. .
4,844,505 * 7/1989   Higuchi .

FOREIGN PATENT DOCUMENTS

75020 * 5/1917 (DE) ............................ 280/FOR 110

* cited by examiner

Primary Examiner—Eric Culbreth
(74) Attorney, Agent, or Firm—Davis & Bujold, P.L.L.C.

(57) ABSTRACT

A vehicle suspension arrangement for a steerable road wheel of a motor vehicle is disclosed having a lower suspension arm 112 for pivotably connecting a wheel hub 111 to part of the body structure 78 of the motor vehicle. The suspension arm 112 is a planar member which lies on the plane P-S-T but has a pivot axis P—P that is offset from the plane P-S-T. In this way the pivot axis P—P of the suspension arm 112 is arranged to be closer to a longitudinal axis L—L of a steering rack 113 than is the plane P-S-T.

20 Claims, 4 Drawing Sheets

SUSPENSION ARRANGEMENT FOR A MOTOR VEHICLE

FIELD OF THE INVENTION

This invention relates to a suspension arrangement for a motor vehicle and in particular to a suspension arrangement for a steerable wheel of a motor vehicle.

BACKGROUND OF THE INVENTION

It is well known to provide a suspension for a steerable road wheel of a vehicle comprising a steering knuckle rotatable about a steering axis to allow steering of the wheel, a suspension arm having connection means at two spaced apart positions at an inner end thereof for pivotably connecting the suspension arm to a sprung part of the vehicle such that it can rotate about a pivot axis that is substantially parallel to the longitudinal axis of the motor vehicle, and being pivotably connected at an outer end thereof to a lower end of the steering knuckle, and a substantially vertical suspension strut pivotably connected at a lower end thereof to the steering knuckle and resiliently connected at an upper end thereof to said sprung part. Such suspension arrangements are often referred to as McPherson strut suspensions.

It is a problem with such a prior art suspension arrangement that it is difficult to arrange for the steering actuator to be positioned close to the pivot axis of the suspension arm without causing interference between the suspension arm and the tie rod. If sufficient clearance is left to avoid this interference, undesirable levels of bump steer can be caused.

Although it is possible to get the steering actuator close to the pivot axis of the suspension arm by using a suspension arm that is of a non-planar configuration this results in the arm being weaker than a planar one, and such a non-planar suspension arm is more expensive and difficult to produce.

It is an object of this invention to provide a suspension arrangement for a motor vehicle that utilizes a substantially planar suspension arm while producing a desired amount of bump steer.

SUMMARY OF THE INVENTION

According to the invention there is provided a suspension for connecting a steerable road wheel to a sprung part of a vehicle which has a longitudinal axis, the suspension comprising a suspension arm having an inner end and an outer end, pivotable connections at two spaced apart positions at said inner end for pivotably connecting the suspension arm to the sprung part of the vehicle such that it can rotate about a pivot axis that is substantially parallel to said longitudinal axis, a substantially vertical suspension strut having an upper end and a lower end and being connected at its upper end to said sprung part, and a steering knuckle pivotably connected to the outer end of the suspension arm and the lower end of the suspension strut such that it is rotatable about a steering axis to allow steering of the wheel, wherein the suspension arm is a substantially planar member and its pivot axis lies outside its plane.

Preferably the plane of the suspension arm is inclined to the pivot axis of the suspension arm.

The present invention further provides a vehicle including a suspension according to the invention and a steering actuator for applying a steering torque to the steering knuckle, the steering actuator having a substantially horizontal longitudinal axis that extends transversely across the vehicle.

The steering actuator preferably extends over the plane of the suspension arm, and the pivot axis of the suspension arm preferably lies above the plane of the suspension arm.

In a preferred embodiment the longitudinal axis of the steering actuator lies closer to the pivot axis of the suspension arm than it does to the plane of the suspension arm.

The invention will now be described by way of example only with reference to the accompanying drawings.

DESCRIPTION OF THE PREFERRED EMBODIMENTS

Figure 1:
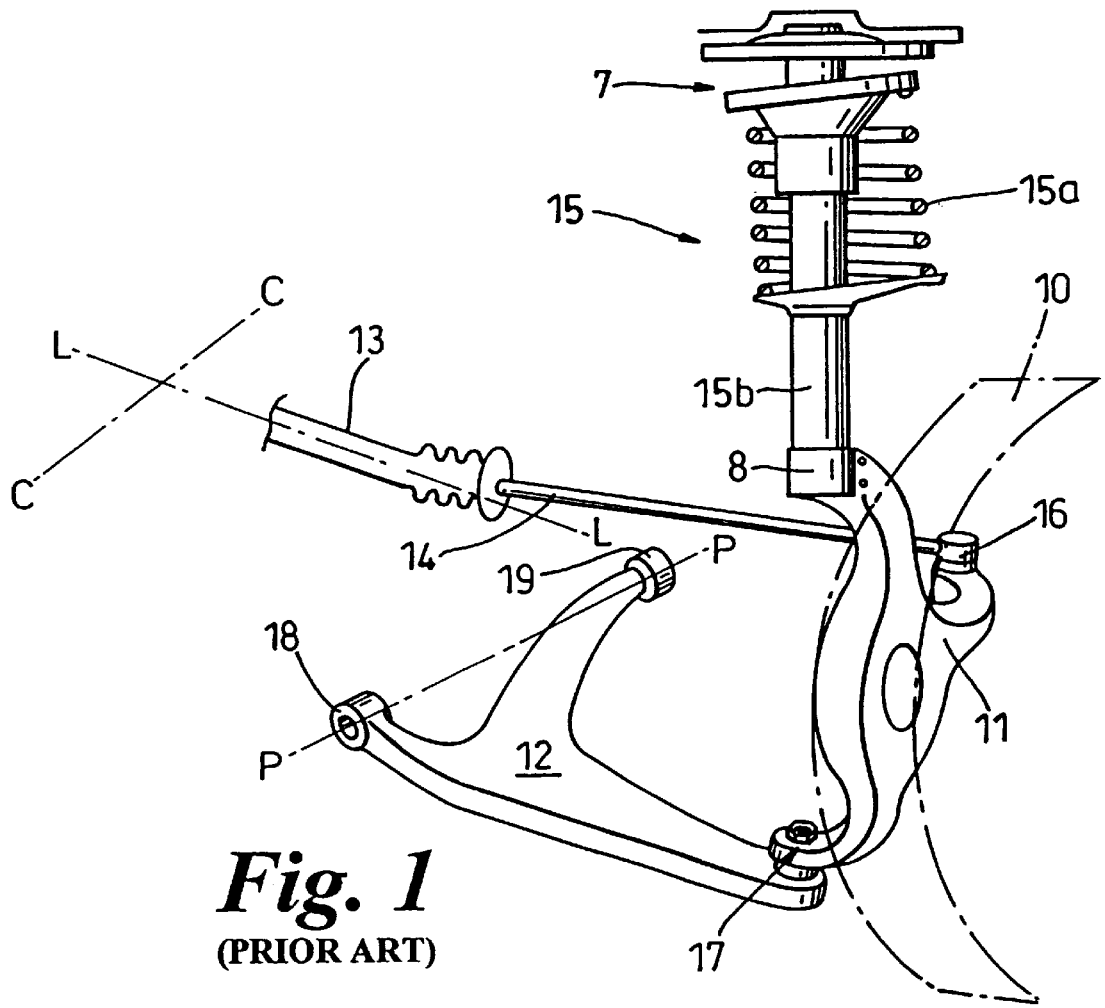
FIG. 1 is a perspective view of a prior art suspension arrangement.
Figure 2:
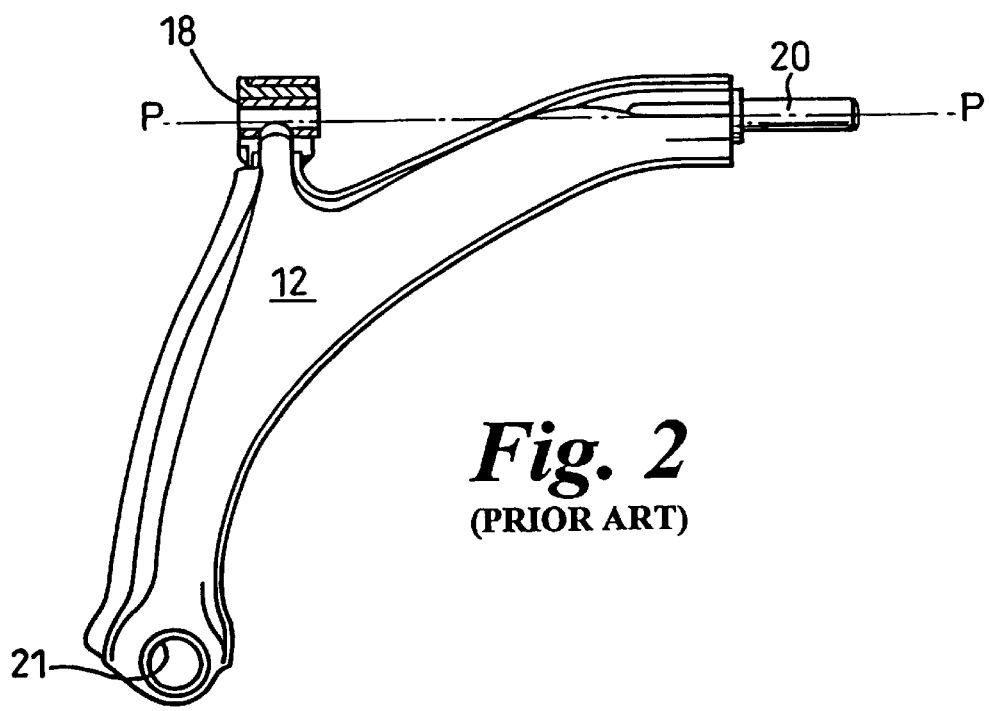
FIG. 2 is a plan view of a suspension arm forming part of the suspension arrangement shown in FIG. 1.

With reference to FIGS. 1 and 2 there is shown a vehicle suspension arrangement for a steerable road wheel 10 of a motor vehicle. The motor vehicle has a body structure (not shown) extending along a longitudinal axis C—C from a front end to a rear end of the motor vehicle.

The suspension arrangement includes a steering knuckle 11 for rotatably supporting the road wheel 10, a suspension arm 12 pivotably connecting the steering knuckle 11 to part of the body structure, a substantially vertical McPherson type suspension strut 15 pivotably connected at a lower end thereof by means of a pivot joint 8 (only diagrammatically shown) to the steering knuckle 11 and a steering actuator in the form of a steering rack 13 for providing a steering input to the steering knuckle 11 to produce rotation of the steering knuckle 11 about a steering axis of the motor vehicle.

The steering rack 13 has a horizontal transverse axis L—L that is arranged transversely with respect to the motor vehicle and is substantially at right angles to the longitudinal axis C—C of the motor vehicle.

The steering rack 13 is connected to the steering knuckle 11 by a tie rod 14. The tie rod 14 is connected at its outer end to the steering knuckle 11 by means of a ball joint 16.

The suspension arm 12 is pivotably connected at two spaced apart positions 18, 19 at an inner end thereof for rotation about a pivot axis P—P that is substantially parallel to the longitudinal axis C—C of the vehicle. The suspension arm 12 is pivotably connected at an outer end thereof by means of a ball joint 17 to lower end of the steering knuckle 11.

A first of said two spaced apart positions is defined by a bush 18 and a second of said spaced apart positions is defined by a spigot 20 that co-operates with a bush 19 supported by part of the body structure of the motor vehicle.

The outer end of the suspension arm 12 has a cup-shaped cavity formed therein to support a part-spherical head of the ball joint 17.

The strut 15 has a spring 15a and damper unit 15b and is resiliently connected at an upper end thereof to part of the body structure by means of an upper spring support 7.

The suspension arm 12 is a planar member and has a pivot axis P—P that lies on the plane of the suspension arm 12. That is to say the pivot axis P—P extends through the center of the bush 18 and the spigot 20.

It will be appreciated that if the vertical displacement between the pivot axis P—P and the transverse axis L—L is reduced below a certain amount the tie rod 14 will foul the upper surface of the suspension arm 12.

Figure 3:
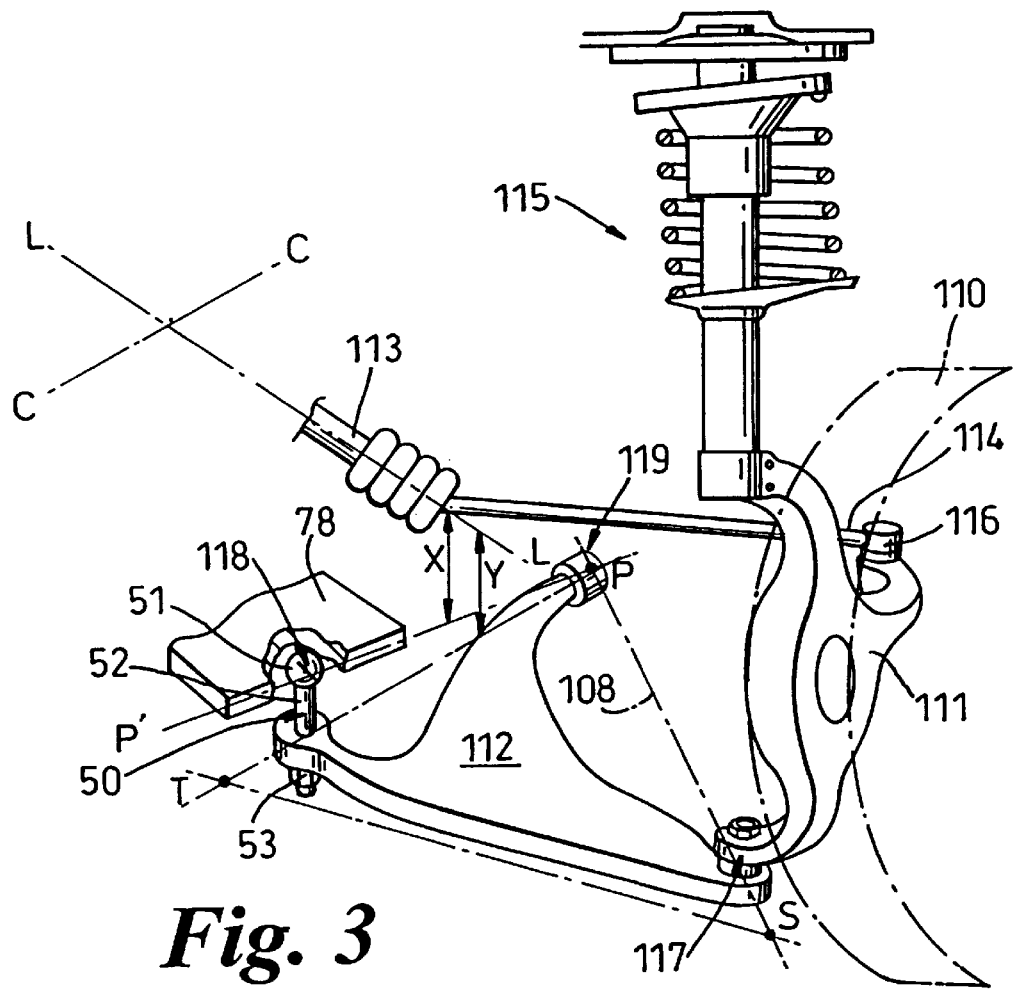
FIG. 3 is a perspective view of a suspension arrangement according to a first embodiment of the invention.
Figure 4:
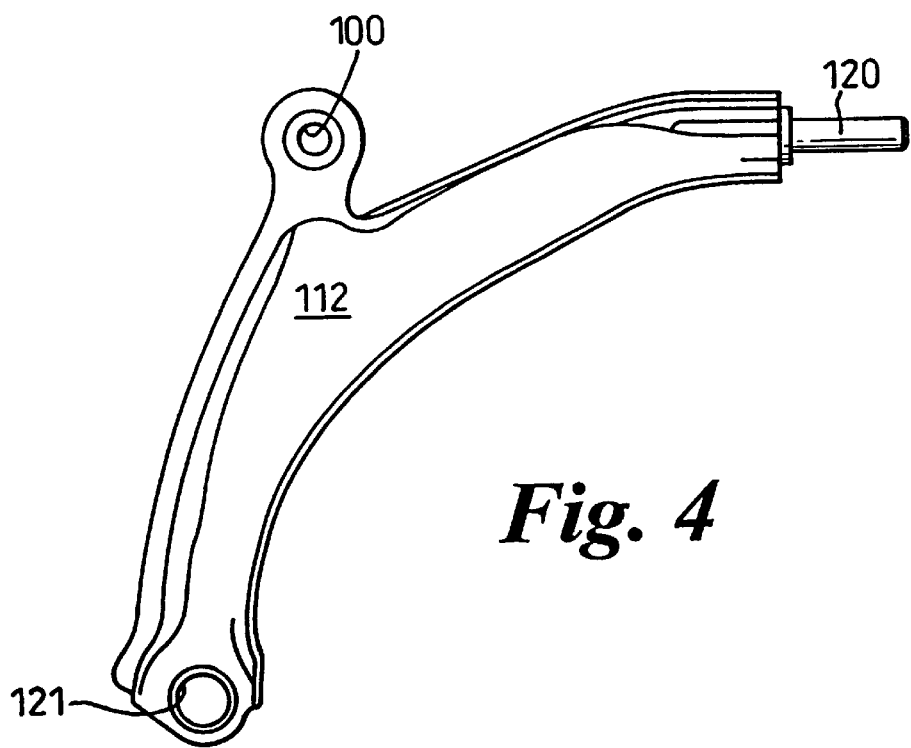
FIG. 4 is a plan view of a suspension arm forming part of the suspension arrangement shown in FIG. 3.

In FIGS. 3 and 4 there is shown a vehicle suspension arrangement for a steerable road wheel 110 of a motor vehicle according to a first embodiment of the invention.

The motor vehicle has a body structure (not shown) extending along a longitudinal axis C—C from a front end to a rear end of the motor vehicle.

The suspension arrangement includes a steering knuckle 111 for rotatably supporting the road wheel 110, a suspension arm 112 pivotably connecting the steering knuckle 111 to part of the body structure, a substantially vertical suspension strut 115 pivotably connected at a lower end thereof by means of two pivot joints to the steering knuckle 111 and a steering actuator in the form of a steering rack 113 for providing a steering input to the steering knuckle 111 to produce rotation of the steering knuckle 111 about the steering axis of the motor vehicle.

The steering rack 113 has a substantially horizontal transverse axis L—L that is arranged transversely with respect to the motor vehicle and is substantially at right angles to the longitudinal axis C—C of the motor vehicle.

The steering rack 113 is connected to the steering knuckle 111 by a tie rod 114. The tie rod 114 is connected at its outer end to the steering knuckle 111 by means of a ball joint 116.

The suspension arm 112 is pivotably connected at two spaced apart positions 118, 119 at an inner end thereof for rotation about a pivot axis P'–P that is substantially parallel to the longitudinal axis C—C of the motor vehicle. The suspension arm is pivotably connected at an outer end thereof by means of a ball joint 117 to a lower end of the steering knuckle 111.

A first of said two spaced apart positions, closer to the front of the vehicle, is defined by a ball joint 50, and a second of said spaced apart positions, the rear one, is defined by a spigot 120 that co-operates with a bush 119 supported by part of the body structure 78 of the motor vehicle.

The outer end of the suspension arm 112 has a cup-shaped cavity 121 formed herein to support a part-spherical head of the ball joint 117.

The ball joint 50 has a part-spherical head portion 51 pivotably engaged with cup (not shown) supported by the body structure 78 and a shank portion 52 secured at one end in a tapered aperture 100 in the suspension arm 112. The shank 52 is tapered to fit the aperture 100 and is held in place by a nut 53.

The length of the shank portion 52 determines the offset at that position between the pivot axis P'–P of the suspension arm 112 and the plane P-T-S of the suspension arm 112.

The pivot axis P'–P of the suspension arm 112 therefore lies outside the plane P-T-S and is offset upwardly therefrom, at least over the area of the suspension arm, so as to lie closer to the longitudinal axis L—L of the steering rack 113. The pivot axis P'–P of the suspension arm 112 also intersects the plane P-T-S at the position 119 of the rear suspension arm mounting 120.

As can best be seen in FIG. 3 the pivot axis P'–P is inclined with respect to the plane P-T-S of the suspension arm 112. The inclination of the pivot axis P'–P of the suspension arm 112 to the plane P-T-S is dependent upon the length of the shank portion 52 of the ball joint 50 and the distance between the two spaced apart positions.

The distance between the pivot axis P'–P and the transverse axis L—L is shown by the arrow X on FIG. 3 and the distance between the plane P-T-S and the longitudinal axis L—L is shown by the arrow Y on FIG. 3.

It will be appreciated that by offsetting the pivot axis P'–P of the suspension arm 112 from the plane P-T-S of the suspension arm 112 in this manner it is possible to arrange for the steering rack 113 to be positioned closer to the pivot axis P'–P of the suspension arm without interference between the tie rod 114 and the suspension arm 112.

It will be appreciated that FIG. 3 shows only one suspension arrangement and that there would be a similar suspension arrangement for the steerable wheel on the other side of the motor vehicle.

Figure 5:
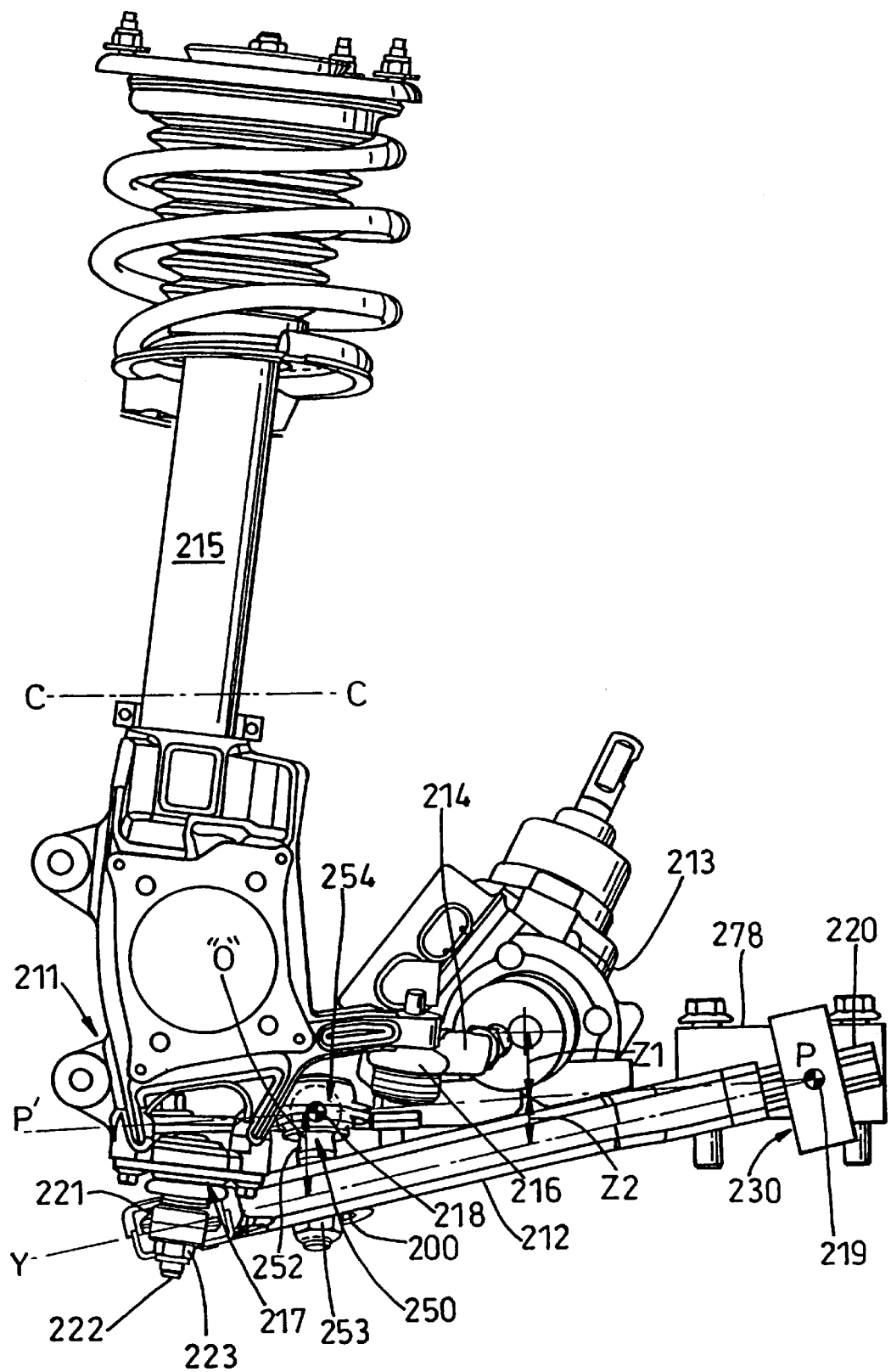
FIG. 5 is a side view of a suspension arrangement according a second embodiment of the invention.
Figure 6:
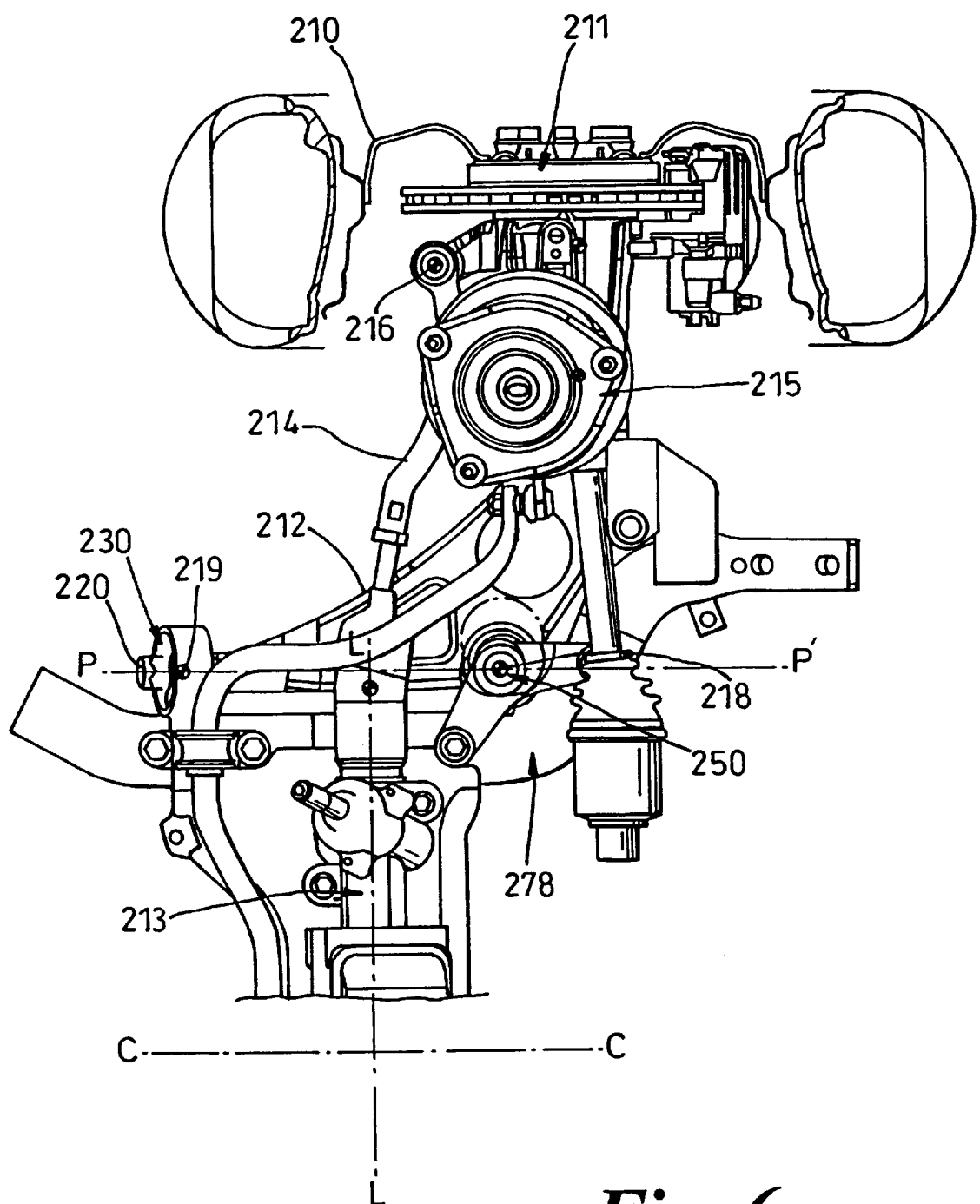
FIG. 6 is a plan view of the suspension arrangement shown in FIG. 5.

In FIGS. 5 and 6 there is shown a vehicle suspension arrangement for a steerable road wheel 210 of a motor vehicle according to a second embodiment of the invention. The motor vehicle has a body structure (not shown) extending along a longitudinal axis C—C from a front end to a rear end of the motor vehicle.

The suspension arrangement includes a steering knuckle 211 for rotatably supporting the road wheel 210, and a suspension arm 212 pivotably connects the steering knuckle 211 to part of the body structure 218. A substantially vertical suspension strut 215 is pivotably connected at a lower end thereof to the steering knuckle 211 and a steering actuator in the form of a steering rack 213 for providing a steering input to the steering knuckle 211 to produce rotation of the steering knuckle 211 about a steering axis of the motor vehicle.

The steering rack 213 has a transverse axis L—L that is arranged transversely with respect to the motor vehicle and is substantially at right angles to the longitudinal axis C—C of the motor vehicle.

The steering rack 213 is connected to the steering knuckle 211 by a tie rod 214. The tie rod 214 is connected at its outer end to the steering knuckle 211 by means of a ball joint 216.

The suspension arm 212 is pivotably connected at two spaced apart positions 218, 219 at an inner end thereof for rotation about a pivot axis P'–P that is substantially parallel to the longitudinal axis C—C of the motor vehicle. The suspension arm 212 is pivotably connected at an outer end thereof by means of a ball joint 217 to a lower end of the steering knuckle 211.

A first of said two spaced apart positions is defined by a ball joint 250 and a second of said spaced apart positions is defined by a spigot 220 that co-operates with a compliance bush 230 supported by part of the body structure 278 of the motor vehicle.

The outer end of the suspension arm 212 has a lug 221 formed thereon to support a shank 222 of the ball joint 217. A nut 223 is used to hold the ball joint 217 in place.

The ball joint 250 has a part-spherical head portion pivotably engaged with a cup-shaped cavity 254 in the body structure 278 and a shank portion 252 secured at one end in a tapered aperture 200 in the suspension arm 212. The shank 252 is tapered to fit the aperture 200 and is held in place by a nut 253.

The length of the shank portion 252 of the ball joint 250 determines the offset "O" at that position between the pivot axis P'–P of the suspension arm 112 and the plane P-Y of the suspension arm 212.

The pivot axis P'–P of the suspension arm 112 therefore lies outside the plane P-Y and is offset upwardly therefrom so as to lie closer to the transverse axis L—L of the steering rack 213.

The distance of the pivot axis P'–P from the tranverse axis L—L is shown by the arrows Z1 on FIG. 5 and the distance of the plane P-Y from the longitudinal axis L—L can be seen to be a further distance Z2 from this axis.

As can best be seen in FIG. 5 the pivot axis P'–P is inclined with respect to the plane P-Y of the suspension arm 212. The inclination of the pivot axis P'–P of the suspension arm to the plane P-Y of the suspension arm is dependent upon the length of the shank portion 252 of the ball joint 250 and the distance between the two spaced apart positions.

It will be appreciated that by offsetting the pivot axis P'–P of the suspension arm 212 from the plane P-Y of the suspension arm 212 in this manner it is possible to arrange for the pivot axis P'–P of the suspension arm 212 to be positioned closer to the transverse axis L—L without interference from the tie rod 214.

It will be appreciated that FIGS. 5 and 6 show only one suspension arrangement and that there would be a similar suspension arrangement for the steerable wheel on the other side of the motor vehicle.

What I claim is:

1. A steerable road wheel suspension for connecting a steerable road wheel to a sprung part of a vehicle which has a longitudinal axis, the suspension comprising a suspension arm having an inner end and an outer end, the inner end of the suspension arm having a pair of spaced apart pivotable connections for pivotably connecting the suspension arm to the sprung part of the vehicle such that the suspension arm is rotatable about a pivot axis extending substantially parallel to said longitudinal axis of the vehicle;

a substantially vertical suspension strut having an upper end and a lower end, the upper end of the substantially vertical suspension strut being connected at the upper end thereof to said sprung part;

a steering knuckle pivotably connected to the outer end of the suspension arm and the lower end of the substantially vertical suspension strut such that the steering knuckle rotatable about a steering axis to allow steering of the wheel of the vehicle; and a steering actuator being connected to the steering knuckle to facilitate steering;

wherein the suspension arm is substantially planar and the pivot axis lies outside a plane defined by the substantially planar suspension arm.

2. The suspension as claimed in claim 1, wherein the plane defined by of the suspension arm is inclined with respect to the pivot axis of the suspension arm.

3. The suspension as claimed in claim 1, wherein one of said pivotable connections of the suspension arm comprises a ball joint.

4. The suspension as claimed in claim 3, wherein the ball joint has a partial spherical head portion mating with a cup portion supported by the body structure and arranged to pivotably engage with the head portion, and a shank portion supports the partial spherical portion out of the plane defined by the substantially planar suspension arm.

5. The suspension as claimed in claim 4, wherein a length of the shank portion defines an offset between the pivot axis of the suspension arm and the plane defined by the suspension arm.

6. The suspension as claimed in claim 4, wherein a length of the shank portion defines an inclination of the pivot axis of the suspension arm relative to the plane defined by the suspension arm.

7. The suspension arm as claimed in claim 4, wherein the shank portion extends substantially perpendicular to the plane defined by the suspension arm.

8. The suspension as claimed in claim 4, wherein the shank portion extends substantially vertically.

9. A vehicle including a suspension as claimed in claim 1 wherein the steering actuator applies a steering torque to the steering knuckle, and the steering actuator has a substantially horizontal longitudinal axis that extends transversely across the vehicle perpendicular to the longitudinal axis of the vehicle.

10. The vehicle as claimed in claim 9, wherein the steering actuator extends above the plane defined by the suspension arm.

11. The vehicle as claimed in claim 9, wherein the pivot axis of the suspension arm lies above the plane defined by the suspension arm.

12. The vehicle as claimed in claim 11, wherein the longitudinal axis of the steering actuator lies closer to the pivot axis of the suspension arm than to the plane defined by the suspension arm.

13. A steerable road wheel suspension for connecting a steerable road wheel to a sprung part of a vehicle which has a longitudinal axis, the suspension comprising a suspension arm having an inner end and an outer end, the inner end of the suspension arm having a pair of spaced apart pivotable connections for pivotably connecting the suspension arm to the sprung part of the vehicle such that the suspension arm is rotatable about a pivot axis extending substantially parallel to said longitudinal axis of the vehicle;

a substantially vertical suspension strut having an upper end and a lower end, the upper end of the substantially vertical suspension strut being connected at the upper end thereof to said sprung part;

a steering knuckle pivotably connected to the outer end of the suspension arm and the lower end of the substantially vertical suspension strut such that the steering knuckle is rotatable about a steering axis to allow steering of the wheel of the vehicle; and a steering actuator being connected to the steering knuckle to facilitate steering;

wherein the suspension arm is substantially planar and the pivot axis lies outside a plane defined by the substantially planar suspension arm, the plane defined by of the suspension arm is inclined with respect to the pivot axis of the suspension arm, one of said pivotable connections of the suspension arm comprises a ball joint, and a shank portion of the ball joint extends substantially vertically and substantially perpendicular to the plane defined by the suspension arm.

14. The suspension as claimed in claim 13, wherein the ball joint has a partial spherical head portion mating with a cup portion supported by the body structure and arranged to pivotably engage with the head portion, and the shank portion supports the partial spherical portion out of the plane defined by the substantially planar suspension arm.

15. The suspension as claimed in claim 14, wherein a length of the shank portion defines an offset between the pivot axis of the suspension arm and the plane defined by the suspension arm.

16. The suspension as claimed in claim 14, wherein a length of the shank portion defines an inclination of the pivot axis of the suspension arm relative to the plane defined by the suspension arm.

17. The suspension as claimed in claim 13, combination with a vehicle, wherein the steering actuator applies a steering torque to the steering knuckle, and the steering actuator has a substantially horizontal longitudinal axis that extends transversely across the vehicle perpendicular to the longitudinal axis of the vehicle.

18. The suspension and vehicle combination as claimed in claim 13, wherein the steering actuator extends above the plane defined by the suspension arm.

19. A steerable road wheel suspension for connecting a steerable road wheel to a sprung part of a vehicle which has a longitudinal axis, the suspension comprising a suspension arm having an inner end and an outer end, the inner end of the suspension arm having a pair of spaced apart pivotable connections for pivotably connecting the suspension arm to the sprung part of the vehicle such that the suspension arm is rotatable about a pivot axis extending substantially parallel to said longitudinal axis of the vehicle;

a substantially vertical suspension strut having an upper end and a lower end, the upper end of the substantially vertical suspension strut being connected at the upper end thereof to said sprung part;

a steering knuckle pivotably connected to the outer end of the suspension arm and the lower end of the substantially vertical suspension strut such that the steering knuckle is rotatable about a steering axis to allow steering of the wheel of the vehicle; and a steering actuator being connected to the steering knuckle to facilitate steering;

wherein the suspension arm is substantially planar and the pivot axis lies outside a plane defined by the substantially planar suspension arm, and one of the pair of spaced apart pivotable connections is a tapered aperture supporting a ball joint and the other of the pair of spaced apart pivotable connections is a spigot.

20. The suspension as claimed in claim 19, wherein an axis which extends through the aperture of the pivotable connection extends substantially perpendicular to a longitudinal axis defined by the spigot.

* * * * *